(12) United States Patent
Fujikawa et al.

(10) Patent No.: US 7,980,468 B2
(45) Date of Patent: *Jul. 19, 2011

(54) PROCESSING METHOD AND APPARATUS FOR RECORDING MEDIA HAVING PRINTED MAGNETIC INK CHARACTERS

(75) Inventors: Masashi Fujikawa, Nagano-ken (JP); Yoshiaki Kinoshita, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/905,263

(22) Filed: Oct. 15, 2010

(65) Prior Publication Data
US 2011/0033111 A1 Feb. 10, 2011

Related U.S. Application Data

(63) Continuation of application No. 11/978,396, filed on Oct. 29, 2007, now Pat. No. 7,837,109.

(30) Foreign Application Priority Data

Nov. 1, 2006 (JP) .................................. 2006-297464

(51) Int. Cl.
*G06K 7/04* (2006.01)
(52) U.S. Cl. ......... 235/445; 235/375; 235/379; 235/475
(58) Field of Classification Search .................. 235/445, 235/375, 379, 475, 480; 705/45
See application file for complete search history.

(56) References Cited

U.S. PATENT DOCUMENTS

| 4,243,983 | A | 1/1981 | Vyas |
| 5,789,727 | A | 8/1998 | Teradaira et al. |
| 5,965,862 | A | 10/1999 | Momose |
| 6,068,187 | A | 5/2000 | Momose |
| 6,182,896 | B1 | 2/2001 | Momose |
| 6,290,129 | B2 | 9/2001 | Momose |
| 2001/0045452 | A1 | 11/2001 | Momose et al. |
| 2003/0126081 | A1 | 7/2003 | Ono |

FOREIGN PATENT DOCUMENTS

| CN | 1137656 A | 12/1996 |
| EP | 0774728 A2 | 5/1997 |
| JP | 09-022478 | 1/1997 |
| JP | 2003-223602 | 8/2003 |
| JP | 2004-206362 | 7/2004 |

*Primary Examiner* — Edwyn Labaze
(74) *Attorney, Agent, or Firm* — Michael T. Gabrik

(57) ABSTRACT

In a method of processing recording media on which magnetic ink characters are printed, the media is transported at a first speed in an upright position along a transportation path from a supply unit to a discharge unit. The magnetic characters are read and output signals representative of the reading generated. The output signals are analyzed, including comparing the output signals with previously stored signal patterns of magnetic ink characters to determine if the magnetic characters can be recognized or not. The transporting of the recording media is paused, or slowed to a second speed substantially lower than the first speed, for a period of time during the analyzing of the output signals. A processing apparatus includes components for carrying out the operations of such method.

13 Claims, 7 Drawing Sheets

PROCESSING METHOD AND APPARATUS FOR RECORDING MEDIA HAVING PRINTED MAGNETIC INK CHARACTERS

CROSS-REFERENCE TO RELATED APPLICATION(S)

This application is continuation of, and claims priority under 35 U.S.C. §120 on, U.S. application Ser. No. 11/978,396, filed on Oct. 29, 2007, the contents of which is incorporated by reference herein. Japanese Patent Application No. 2006-297464 is also incorporated by reference in its entirety.

BACKGROUND

1. Field of Invention

The present invention relates to a method of processing recording media in a recording medium processing apparatus such as a check reading device that is used to read magnetic ink characters from a recording medium such as checks or promissory notes that are printed with magnetic ink characters. More specifically, the invention relates to a recording media processing method enabling control of the transportation state of a recording medium based on the detection signals of a magnetic head that reads the magnetic ink characters. The apparatus is also capable of efficiently executing a post-processing step such as sorting the recording media. The invention further relates to a recording media processing apparatus that implements the method operations.

2. Description of Related Art

In banks and other financial institutions checks, promissory notes, and similar recording media are passed through a check reader to read the magnetic ink characters and, for example, sort the recording media based on the result of this reading operation. As electronic check processing has become more common, the read magnetic ink character data is also computer processed and the check instruments are managed by computer.

JP-A-2004-206362 teaches this type of check reading device. This check reading device uses a flapper to switch the paper transportation path based on the result of reading the magnetic ink characters and selectively discharge the media to either of two discharge trays. After reading by the magnetic head used for reading the magnetic ink characters, the checks are conveyed at a different speed passed the reading position of an image scanning sensor so that the checks are also imaged.

When a check is inserted to the check reading device, the top and bottom or front and back may be reversed. The magnetic ink characters are printed in a prescribed position on the front of the check. The magnetic head for reading the magnetic ink characters is also disposed to the transportation path at the position where the magnetic ink characters on a correctly inserted check pass. Therefore, if a check is conveyed with the top and bottom or the front and back reversed, the area where the magnetic ink characters are printed will not pass in contact with the magnetic head and the magnetic head cannot correctly read the magnetic ink characters.

If the checks are sorted and selectively deposited into either one of two discharge trays by using a flapper to switch the paper transportation path based on the result of reading the magnetic ink characters as in the check reading device taught in JP-A-2004-206362, this sorting operation can be executed efficiently and with good precision if check transportation errors can be detected.

It is often not possible to increase the length of the transportation path in the small check reading devices that are used at bank teller windows, for example, due to space limitations. However, if the transportation path is too short, the leading end of the check may have already reached a position near the flapper for sorting into the two discharge trays when the trailing end of the check passes the reading position of the magnetic head. The time that is required to evaluate the result of magnetic ink character reading by the magnetic head and switch the flapper based on the result therefore cannot be assured in this type of small check reading device. In other words, the check has already passed the flapper sorting position and is sent towards one of the discharge trays before the reading result can be evaluated or before the flapper can be switched based on the result of this evaluation.

As a result, a problem to be solved with compact check reading devices according to the prior art is that checks cannot be correctly sorted based on the result of reading the check by a magnetic head or image scanning sensor. Conventional compact check reading devices therefore do not have two or more discharge trays for sorting as taught in JP-A-2004-206362, and discharge checks into a single discharge tray. This then requires manually sorting the checks deposited into the discharge tray and makes the task of processing checks inefficient.

SUMMARY OF INVENTION

According to embodiments of the invention, an apparatus and method for processing recording media having printed magnetic ink characters evaluate the result of reading the recording medium based on a detection signal from a magnetic head, and efficiently execute a post-processing operation, such as sorting the recording media after passing the reading position of the magnetic head, based on the result of this evaluation.

An apparatus and method for processing recording media having printed magnetic ink characters according to another aspect of the invention enable sorting the recording media after reading into one or another of a plurality of discharge parts based on the result of reading the magnetic ink characters even in a check reading device that has a short transportation path.

One aspect of the invention involves a method of processing recording media on which magnetic ink characters are printed. The method includes transporting the recording media at a first speed in an upright position along a transportation path from a recording media supply unit to a recording media discharge unit; reading magnetic characters printed on the recording media and generating output signals based thereon; analyzing the output signals using a magnetic character reader disposed to the transportation path, the analyzing including comparing the output signals with previously stored signal patterns of magnetic characters to determine if the magnetic ink characters can be recognized or not; and pausing the transporting of the recording media for a period of time during the analyzing of the output signals, or slowing the transporting of the recording media to a second speed substantially lower than the first speed for a period of time during the analyzing of the output signals.

In another aspect the invention entails a recording media processing apparatus for processing recording media on which magnetic ink characters are printed. The apparatus comprises a recording media supply unit for supplying the recording media; a recording media discharge unit for storing the recording media; a transportation path for guiding the recording media fed from the recording media supply unit in an upright position to the recording media discharge unit; a magnetic ink character reader disposed to the transportation path for generating output signals upon reading magnetic characters printed on the recording media; a transport unit for transporting the recording media along the transportation path; and a character recognition unit for analyzing the output signals from the magnetic ink character reader by comparing the output signals with previously stored signal patterns of magnetic ink characters. The transport unit pauses the transporting of the recording media for a period of time during the analyzing of the output signals.

In another aspect of the apparatus, the transport unit transports the recording media along the transportation path at a first speed and temporarily slows the transporting of the media to a second speed substantially lower than the first speed for a period of time during the analyzing of the output signals.

In another arrangement, the recording media discharge unit comprises a plurality of discharge parts, and the recording media processing apparatus further comprises a sorting unit for sorting each particular recording media into one of the discharge parts based on character recognition results.

In some embodiments, the length of the transportation path from the magnetic ink character reader to the sorting unit is substantially equal to or shorter than the length of the recording medium.

Preferably, the apparatus further comprises a printing mechanism upstream of the discharge unit.

The magnetic ink character reader may be a magnetic head, an image scanner, or other suitable device.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of a recording media reading apparatus according to the present invention are described below with reference to the accompanying figures.

Figure 1:
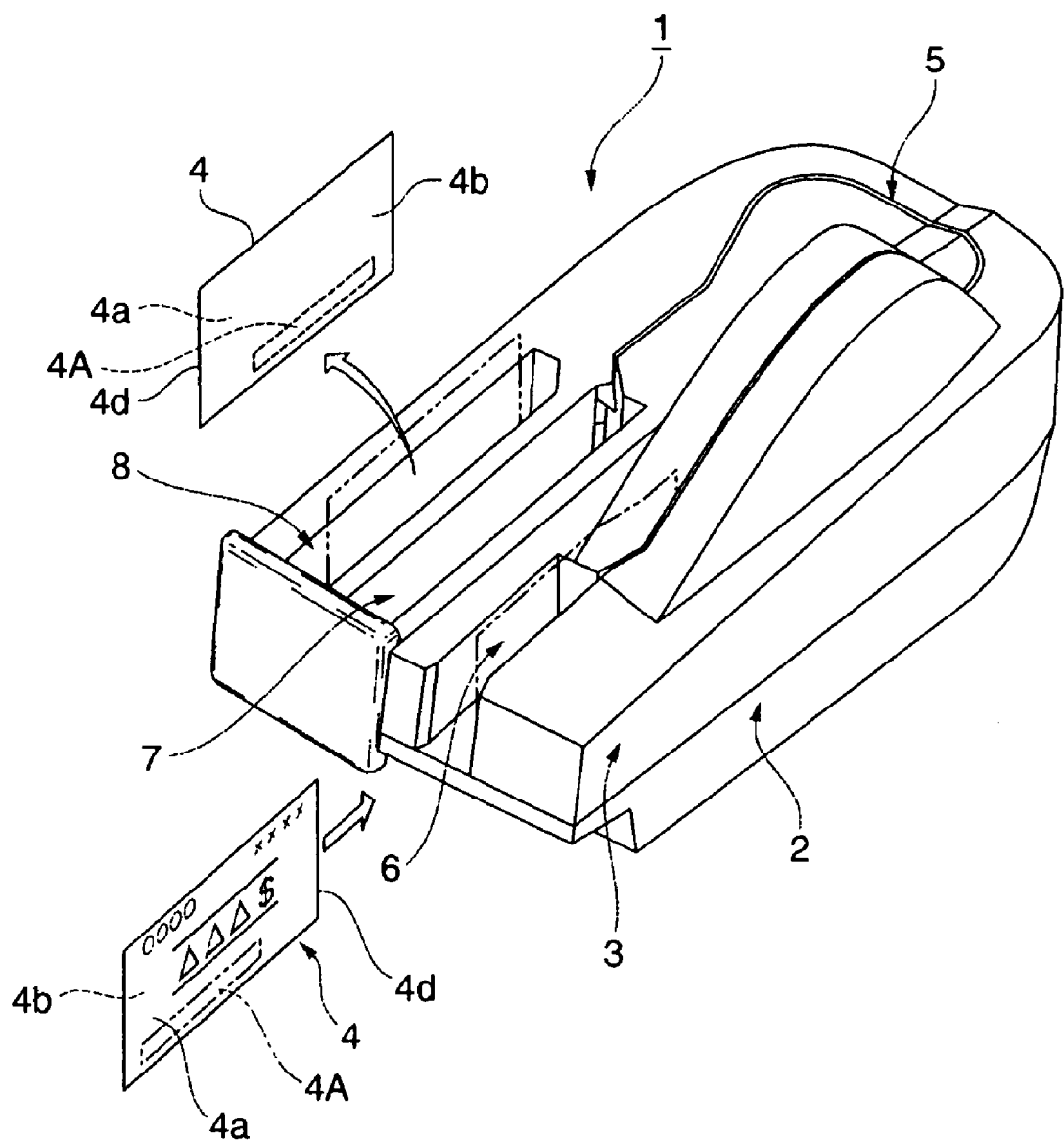
FIG. 1 is an oblique view of a check reading device according to the present invention.

FIG. 1 is an oblique view of a check reading device according to a preferred embodiment of the invention. This check reading device 1 has a main case 2 and a cover case 3 covering the top of the main case 2, and various parts are assembled inside. A transportation path 5 for conveying checks 4 is formed in the cover case 3 as a narrow vertical channel that is substantially U-shaped when seen from above.

One end of the transportation path 5 is connected to a check supply unit 6 that is a wide vertical slot, and the other end of the transportation path 5 branches left and right and is connected to first and second check discharge units 7 and 8, both of which are wide vertical slots.

The checks 4 have a magnetic ink character line 4A printed lengthwise along the bottom edge part of the check front 4a. The check amount, payer, check number, and signature are also recorded on the check front 4a against a specific background pattern, and an endorsement line is provided on the check back 4b. As shown in FIG. 1, the checks 4 are inserted to the check supply unit 6 with the tops and bottoms aligned and the check front 4a facing the outside of the U-shaped transportation path 5. The checks 4 are therefore fed from the leading end 4d side into the transportation path 5.

As the checks 4 fed from the check supply unit 6 travel through the transportation path 5, the front and back sides of the check 4 are imaged and the magnetic ink character line 4A printed on the check front 4a is read. If this information is read normally, an endorsement is printed and the check 4 is directed and discharged into the first check discharge unit 7. If a read error occurs or reading is not possible, an endorsement is not printed and the check 4 is diverted and discharged into the second check discharge unit 8.

Figure 2:
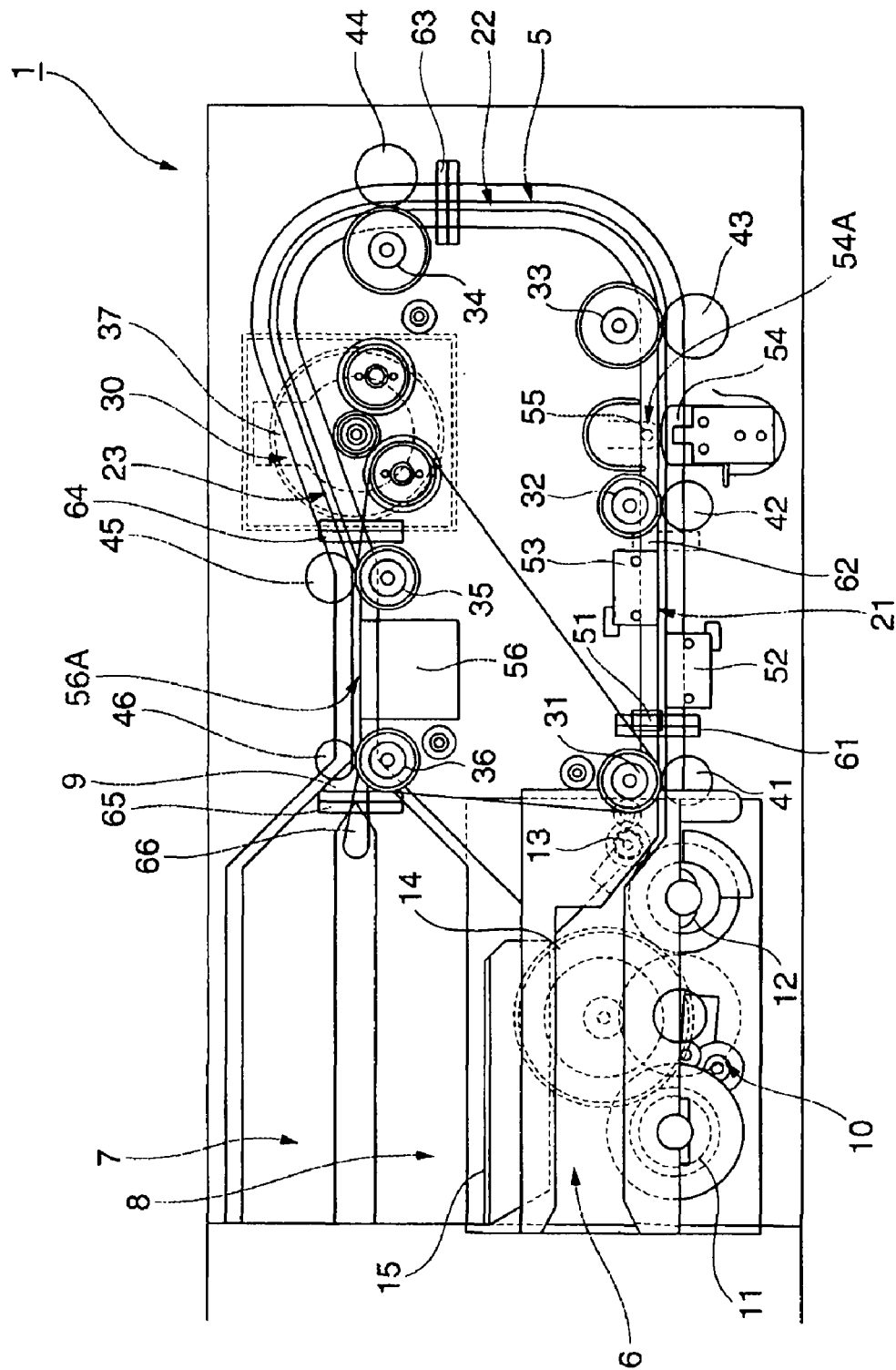
FIG. 2 describes the internal arrangement of the check reading device.

FIG. 2 describes the internal structure of the check reading device 1. A check feeding mechanism 10 for feeding the checks 4 from the check supply unit 6 into the transportation path 5 is disposed to the check supply unit 6. The check feeding mechanism 10 includes a pickup roller 11, a feed roller 12, a retard roller 13 that presses against the feed roller 12, a feed motor 14, and a hopper 15 for pressuring the checks. When the feed motor 14 drives, the checks 4 loaded in the check supply unit 6 are pressed to the pickup roller 11 side by the hopper 15, and the pickup roller 11 and the feed roller 12 then rotate synchronously. The pickup roller 11 feeds the checks 4 between the feed roller 12 and the retard roller 13. A prescribed torque load is applied to the retard roller 13, which works so that only the one check 4 in direct contact with the feed roller 12 is separated from the other checks and fed into the transportation path 5.

The transportation path 5 is a U-shaped path including an upstream-side transportation path portion 21 connected to the check supply unit 6, a downstream-side transportation path portion 23 connected to the first and second check discharge units 7 and 8, and a curved transportation path portion 22 connecting the portions on the upstream and downstream sides.

The transportation mechanism 30 that conveys checks 4 fed from the check supply unit 6 into the transportation path 5 along the transportation path 5 includes first to sixth transportation rollers 31 to 36, first to sixth pressure rollers 41 to 46 that are pressed against and rotation in conjunction with the first to sixth transportation rollers 31 to 36, and a transportation motor 37 for rotationally driving the first to sixth transportation rollers 31 to 36. A stepping motor, for example, is used as the transportation motor 37. How far a check 4 has travelled can therefore be known from the number of steps the stepping motor is driven.

The first to third transportation rollers 31 to 33 are respectively disposed to the upstream-side transportation path portion 21 at the upstream end, the middle, and the boundary to the curved transportation path portion 22. The fourth transportation roller 34 is disposed at a position on the downstream side of the curved transportation path portion 22. The fifth and sixth transportation rollers 35 and 36 are disposed to the downstream-side transportation path portion 23 at positions in the middle and the downstream end.

Disposed in order from the upstream side to the upstream-side transportation path portion 21 of the transportation path 5 between the first and second transportation rollers 31 and 32 are a magnet 51 for magnetizing the magnetic ink characters, a front contact image scanner 52 as a front image reading means, and a back contact image scanner 53 as a back image reading means. A magnetic head 54 for magnetic ink character reading is disposed between the second and third transportation rollers 32 and 33, and a pressure roller 55 for pressing the checks 4 to the magnetic head is disposed opposite the magnetic head 54.

A printing mechanism 56 for printing an endorsement on checks 4 is disposed to the downstream-side transportation path portion 23 between the fifth and sixth transportation rollers 35 and 36. The printing mechanism 56 can move by means of a drive motor (not shown in the figure) between a printing position 56A pressed against the check 4, and a standby position retracted from the printing position 56A. The printing mechanism 56 could be a stamp instead of a print head.

Various sensors for check transportation control are disposed to the transportation path 5.

A paper length detector 61 for detecting the length of the check being fed is disposed to a position before the magnet 51.

A multifeed detector 62 for detecting if multiple checks 4 are being fed together is disposed between the back contact image scanner 53 and the second transportation roller 32.

A paper jam detector 63 is disposed to a position before the fourth transportation roller 34. If a check 4 is detected continuously by this detector for longer than a prescribed time, a paper jam in which a check 4 is stuck in the transportation path 5 is known to have occurred.

A print detector 64 for detecting if a check 4 on which an endorsement is to be printed by the printing mechanism 56 is present is disposed to a position before the fifth transportation roller 35.

A discharge detector 65 for detecting a check 4 to be discharged into the first and second check discharge units 7 and 8 is disposed at a position downstream from the sixth transportation roller 36, or more specifically to the routing channel 9 that branches to the first and second check discharge units 7 and 8.

A gate lever 66 (flapper) that is a sorting unit switched by a drive motor not shown is disposed to the routing channel 9. The gate lever 66 selectively switches the downstream end of the transportation path 5 to the first or second check discharge unit so that the check 4 is guided to the selected discharge unit.

The length of the transportation path 5 from the reading position 54A of the magnetic head 54 to the printing position 56A of the printing mechanism 56 is substantially equal to or slightly shorter than the length of the long side (transportation direction) of the checks 4 to be read. Therefore, when the leading end of the check 4 reaches the printing position 56A, the trailing end of the check 4 or the trailing end of the magnetic ink character line 4A has just passed the reading position 54A of the magnetic head 54. In addition, the length from the reading position 54A of the magnetic head 54 to the end of the gate lever 66 on the upstream side can also be rendered substantially equal to or slightly shorter than the length of the long side (transportation direction) of the checks 4 to be read.

Figure 3:
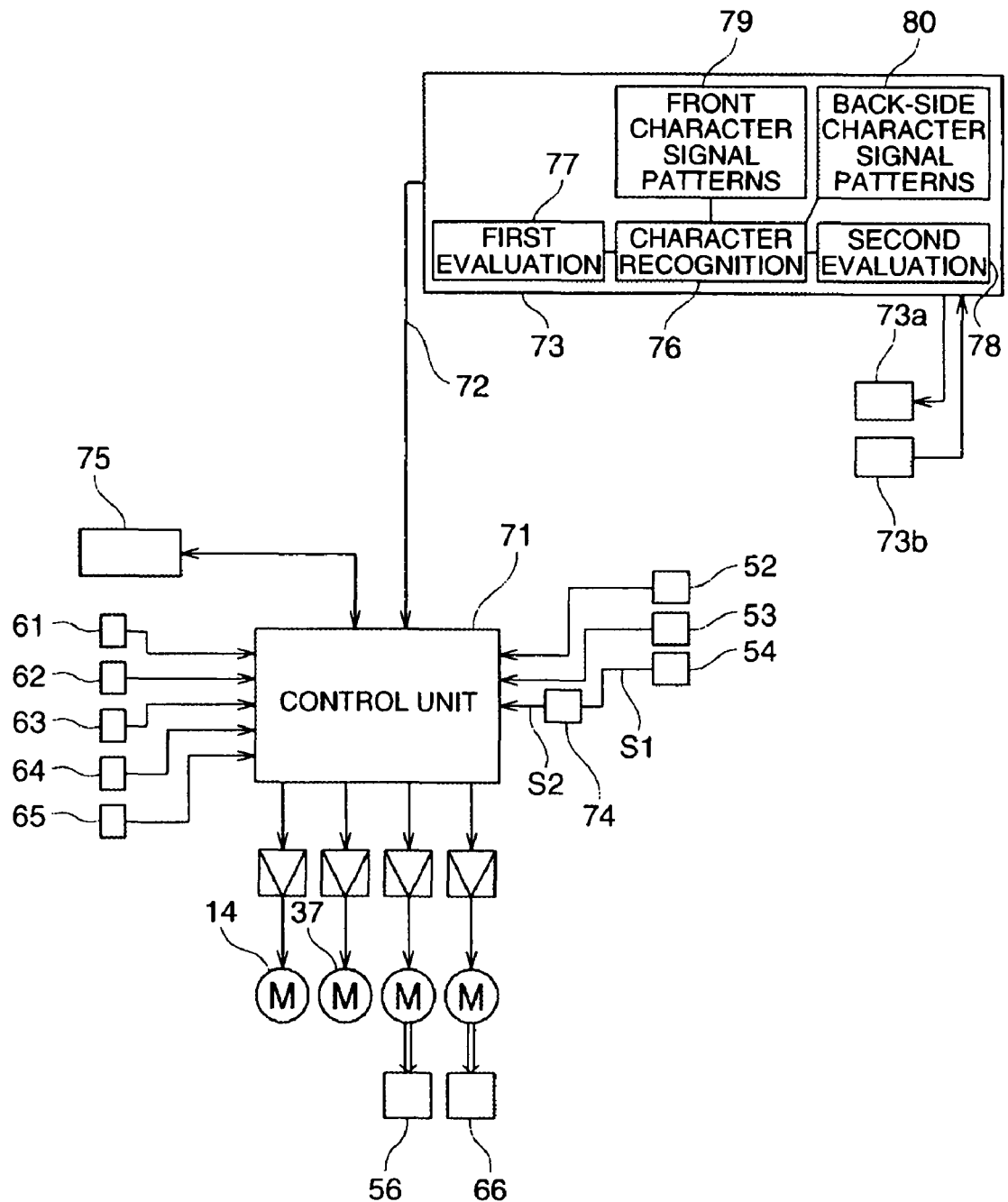
FIG. 3 is a schematic block diagram of the control system of the check reading device.

FIG. 3 is a schematic block diagram showing the control system of the check reading device 1. The control system of the check reading device 1 has a control unit 71 that includes a CPU and has memory such as ROM or RAM. The control unit 71 is connected to a host computer system 73 by a communication cable 72.

The computer system 73 has a display 73a and input/output devices such as a keyboard, mouse, or other operating unit 73b, and commands such as a start command for the check reading operation are input from the computer system 73 to the control unit 71.

When a command to start reading is received, the control unit 71 drives the check feed motor 14 and the transportation motor 37 to feed a check 4 into the transportation path 5 and convey the fed check 4 through the transportation path 5. The front image data, back image data, and the magnetic ink character information from the check 4 that are captured by the front contact image scanner 52, the back contact image scanner 53, and the magnetic head 54 are input to the control unit 71.

The magnetic head 54 outputs the electromotive force produced by the change in the magnetic field formed by the passing magnetic ink character line 4A as the detection signal S1. The detection signal S1 is converted to a digital signal S2 after amplification and wave shaping by a signal processing circuit 74, and input to the control unit 71.

This input information is then supplied to the computer system 73 for image processing and character recognition and deciding if the check was read correctly, and the result of this evaluation is then supplied to the control unit 71.

The control unit 71 controls driving the printing mechanism 56 and the gate lever 66 based on the result of this evaluation to print or not print on the read check 4 and route the check 4 to the first check discharge unit 7 or the second check discharge unit 8. Image processing, character recognition processing, and deciding whether the check was read normally could also be done by the control unit 71.

Transportation control of the check 4 by the control unit 71 is based on detection signals from the paper length detector 61, the multifeed detector 62, the paper jam detector 63, the print detector 64, and the discharge detector 65 that are disposed along the transportation path 5. An operating unit 75 including a power switch and other operating buttons disposed to the main case 2 is also connected to the control unit 71.

The computer system 73 has a character recognition unit 76 and first and second evaluation units 77 and 78. The character recognition unit 76 and first and second evaluation units 77 and 78 recognize the magnetic ink characters in the magnetic ink character line 4A based on the detection signals from the magnetic head 54, and the first and second evaluation units 77 and 78 determine if the top/bottom and front/back orientations of the check 4 are reversed based on the detection signals. The character recognition unit 76 has a magnetic ink character pattern recognition function for comparing the detection signals with digital data patterns (front character signal patterns 79, back-side character signal patterns 80) corresponding to the detection signal waveforms of the magnetic ink characters and recognizing the characters.

Based on the detection signals, the first evaluation unit 77 determines if check 4 was correct, if check 4 was fed with the top and bottom inverted, or if a non-check paper sheet that is not printed with magnetic ink characters was fed, based on whether or not there is any actual change in the detection signal waveform from the magnetic head 54.

The second evaluation unit 78 determines if the check 4 was conveyed with the front and back reversed by comparing the detection signals with digital data patterns (back-side character signal patterns 80) that correspond to the detection signal waveforms that are output when the magnetic head 54 reads the magnetic ink characters on the check from the back side.

The character recognition unit 76, the first and second evaluation units 77 and 78, and the digital data patterns 79 and 80 can be disposed on the control unit 71 side in the check reading device 1.

Figure 4:
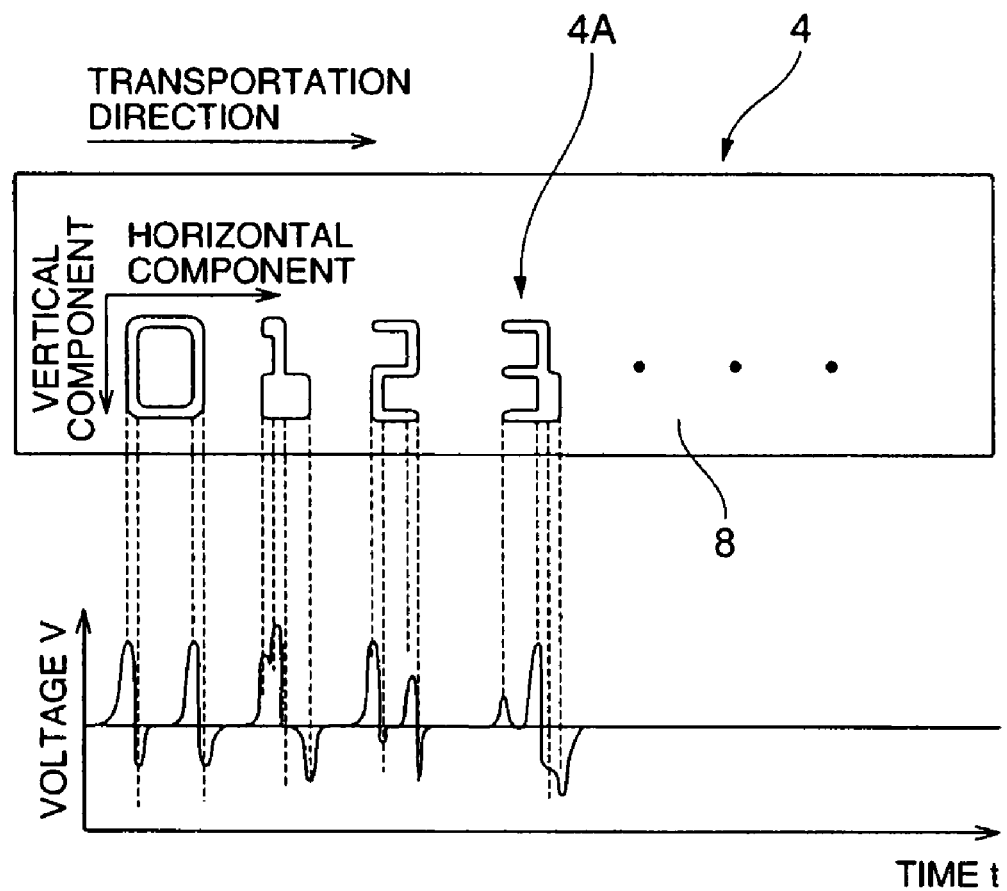
FIG. 4 is a signal waveform diagram showing an example of the detection signal waveform from the magnetic head.

FIG. 4 is a signal waveform diagram showing the correlation between the detection signal waveforms from the magnetic head 54 and the magnetic ink characters. The magnetic head 54 outputs a unique detection signal waveform for each magnetic ink character contained in the magnetic ink character line 4A of the check 4 passing the reading position of the magnetic head 54 at a prescribed speed. Digital data patterns corresponding to these detection signal waves are previously stored as the front character signal patterns 79, and the characters can be recognized by comparing the digital data for the detection signal waves actually detected by the magnetic head 54 with the front character signal patterns 79.

Figure 5:
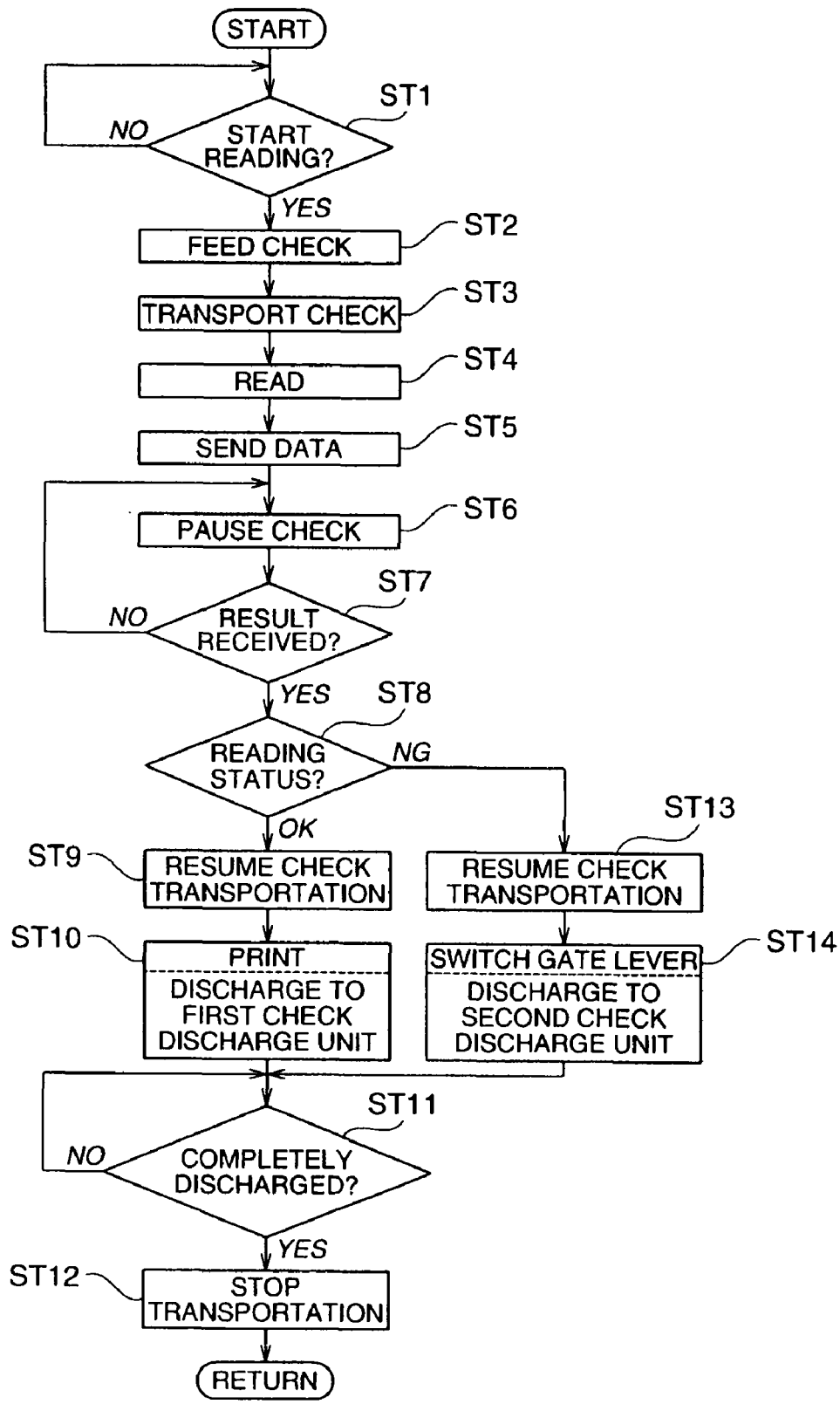
FIG. 5 is a flow chart describing the operation of the check reading device.

FIG. 5 is a flow chart showing the processing operation of the check reading device 1. The reading operation is described using this flow chart.

When the operator inputs a command to start reading from the operating unit 73b of the computer system 73 to the check reading device 1, driving the check feeding mechanism 10 and the check transportation mechanism 30 starts to feed and convey the checks 4 loaded in the check supply unit 6 one at a time through the transportation path 5 (steps ST1, ST2, ST3). The position of the conveyed check 4 is managed based on the number of steps the transportation motor 37 (the stepping motor) is driven from when the leading end of the check 4 is detected by the paper length detector 61. The trailing end of the check 4 is when the check 4 is no longer detected by the paper length detector 61. The length and the position of the check 4 are known from the transportation distance and the time required for the leading and trailing ends of the check 4 to pass.

Front and back images of the conveyed check 4 and the magnetic ink characters are read by the front contact image scanner 52, the back contact image scanner 53, and the magnetic head 54 (step ST4).

The read information is then sent via the communication cable 72 to the computer system 73 (step ST5). The computer system 73 then processes the front check image, the back check image, and the magnetic ink character information, and determines if the check was read normally. If the check 4 is determined to be upside down, if the front and back of the check 4 are determined to be reversed, or if part of the magnetic ink characters cannot be read, reading is determined to be no good. Reading is also determined to be no good if the check amount or other specific information cannot be recognized from the front and back image data. The process of determining if the top and bottom or front and back of the check 4 are reversed is described further below (FIG. 6).

When the leading end of the conveyed check 4 reaches the printing position 56A of the printing mechanism 56 for endorsement printing, the transportation mechanism 30 on the check reading device 1 side pauses conveying the check 4 (step ST6). With check 4 transportation paused, the check reading device 1 waits to receive the result of determining whether the check was correctly read from the computer system 73 (step ST7). The control unit 71 can alternatively process the read front image data, back image data, and magnetic ink characters and determine if the check was read correctly.

If the result of this decision is received and the check was read correctly, transporting the check 4 resumes and the printing mechanism 56 is moved to the printing position at the same time (steps ST8, ST9). The check 4 is then conveyed while the printing mechanism 56 prints the endorsement, and is discharged by the gate lever 66 to the first check discharge unit 7 side (step ST10). Driving the transportation mechanism 30 stops after the discharge detector 65 detects the trailing end of the check 4 (steps ST11, ST12). Feeding and conveying the next check then starts.

If the check cannot be read or a reading error results (step ST8), conveying the check 4 resumes (step ST13) and the gate lever 66 is switched at the same time. The printing mechanism 24 is also held in the standby position and does not print an endorsement on the check 4. The check 4 is then diverted and discharged into the second check discharge unit 8 by the gate lever 66 (step ST14). Driving the transportation mechanism 30 stops after the discharge detector 65 detects the trailing end of the check 4 (steps ST11, ST12). Feeding and conveying the next check then starts.

If multifeeding of the checks is detected by the multifeed detector 62, the control unit 71 executes an interrupt process, immediately stops transportation, reports that a transportation error occurred by means of a warning indicator on the operating unit 75, for example, and waits for the check to be removed from the transportation path 5 and the starting position reset. A similar interrupt process is executed when the paper jam detector 63 detects that a check has jammed in the transportation path 5.

An evaluation process for determining if the top and bottom or front and back of the conveyed check 4 are reversed based on a detection signal S1 from the magnetic head 54 is described next with reference to the diagrams and flow chart shown in FIG. 6A and FIG. 6B.

Figure 6A:
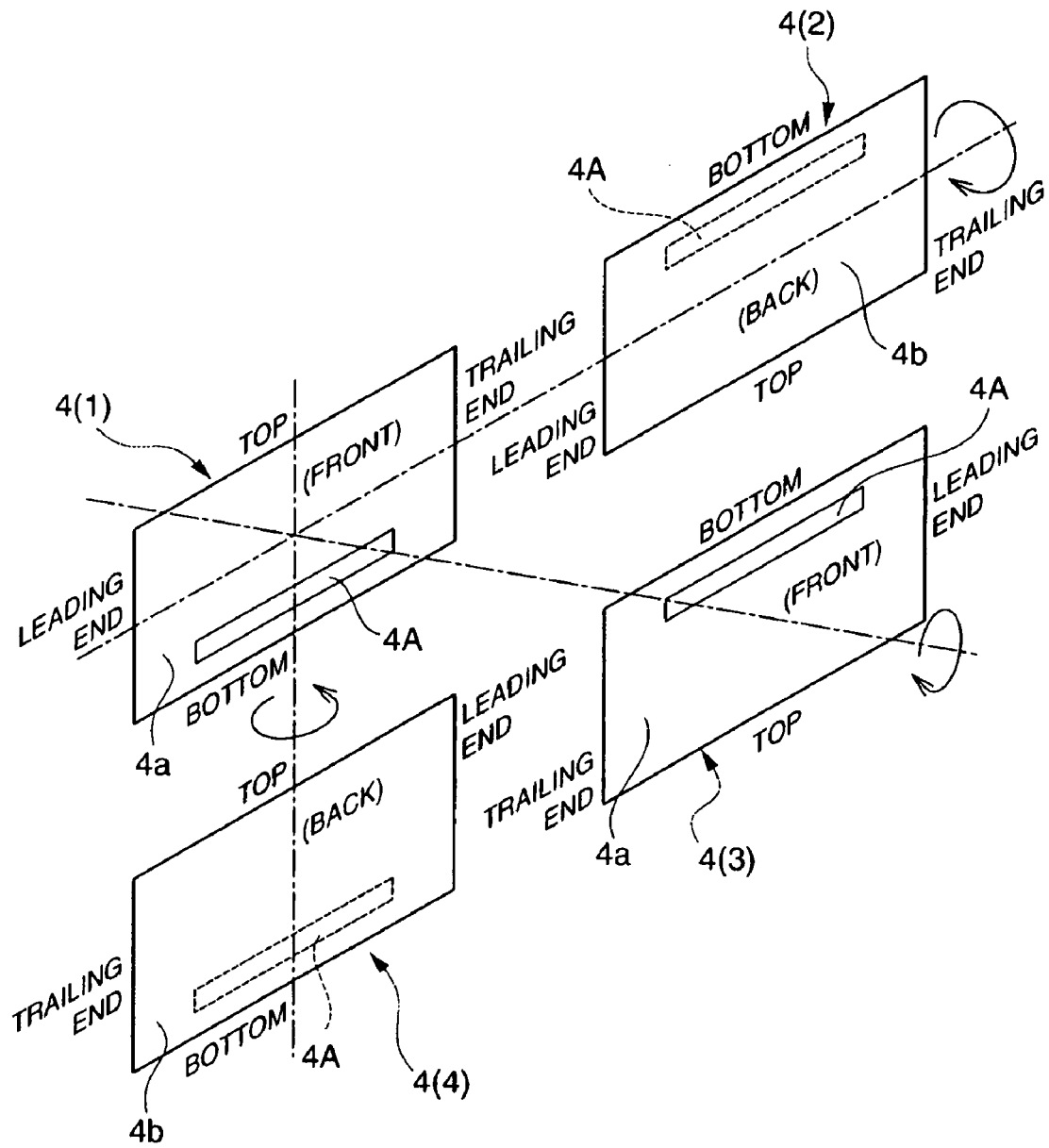
FIG. 6A describes the top and bottom, and front and back orientations of a check.
Figure 6B:
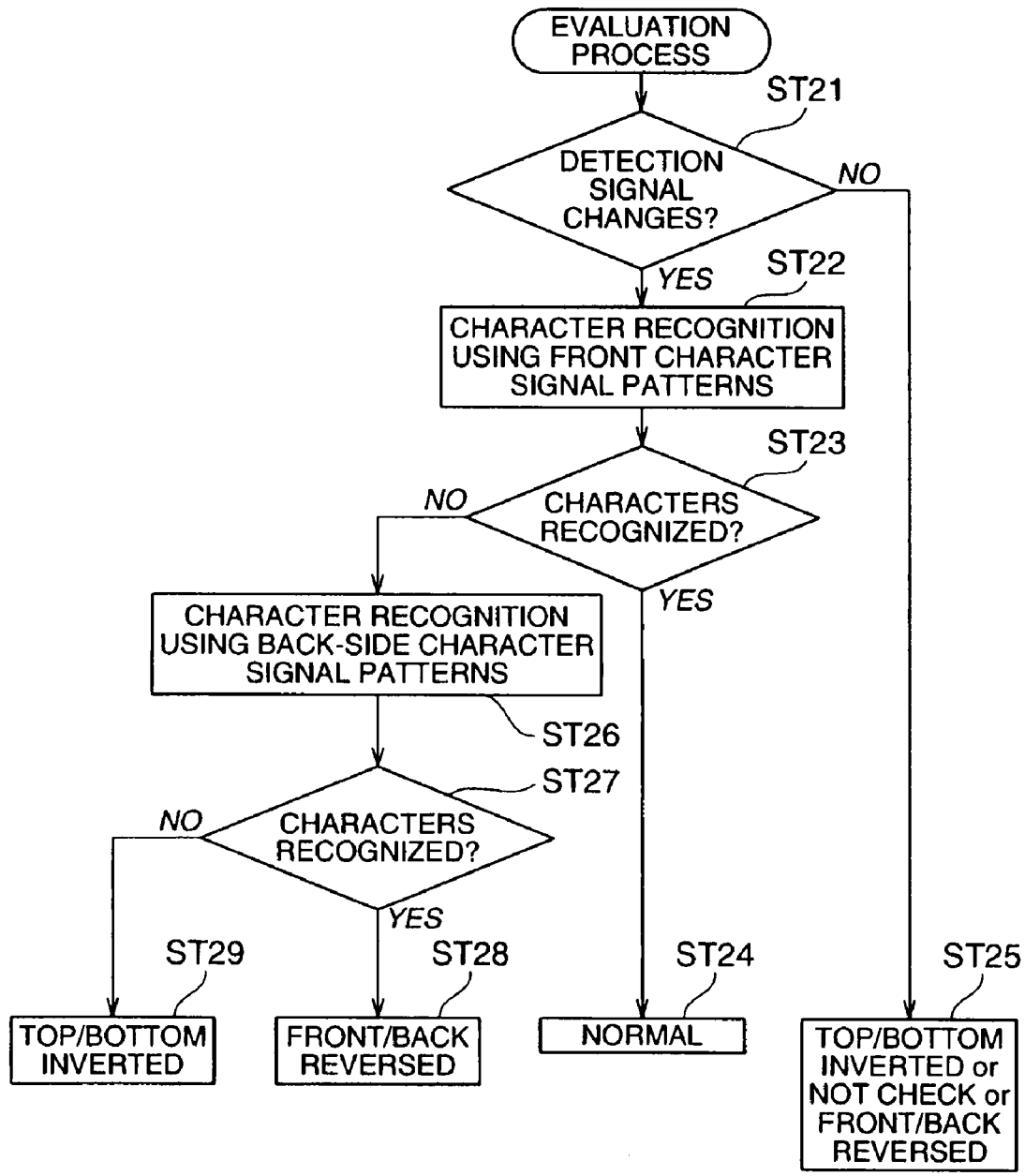
FIG. 6B is a flow chart of a process for determining the top and bottom, and front and back orientation of a check.

FIG. 6A shows the various orientations in which a check 4 can be inserted. Check 4(1) is a check 4 inserted in the normal insertion position, and check 4(2) is a check 4 inserted with both the top and bottom and the front and back reversed. Check 4(3) is a check 4 inserted with the top and bottom and the leading and trailing ends reversed, and check 4(4) is a check 4 inserted with the front and back and the leading and trailing ends reversed.

With checks 4(2) and 4(3) the position of the magnetic ink character line 4A is inverted top and bottom from the position on the normally inserted check 4(1), and the magnetic ink character line 4A therefore cannot be read by the magnetic head 54. With check 4(4) the magnetic ink character line 4A will be read from the back side by the magnetic head 54.

These different check orientations can be determined from the detection signals output by the magnetic head 54 in this embodiment of the invention.

This process is described below with reference to the flow chart in FIG. 6B. The first step is to determine if there is actually any change in the detection signal from the magnetic head 54 (step ST21). More specifically, whether the amplitude of the detection signal waveform varies a prescribed amount or more is determined. Because the magnetic head 54 cannot read the magnetic ink character line 4A and there is no actual change in the detection signal with checks 4(2) and 4(3), the conveyed check is determined to be a check 4(2) and 4(3) with the top and bottom inverted (step ST25). Alternatively, the medium can be determined to be a sheet of paper other than a check on which a magnetic ink character line 4A is not printed. If the check 4(4) is inserted with the front and back reversed and the check is made of thick paper, the amplitude of the waveform of the detection signal from the magnetic head 54 may not vary the prescribed amount or more. This situation can also be determined (step ST25).

If there is actually any change in the detection signal, the detection signals are compared with the detection signal patterns (front character signal patterns 79) for the magnetic ink characters that are previously stored for character recognition (step ST22). If character recognition is possible, it is determined that the check 4 is being conveyed in the normal position (step ST24). More specifically, the check is in the position of check 4(1).

If character recognition is not possible, the detection signals are compared with the previously stored back-side character signal patterns 80 for character recognition (step ST26). If character recognition is possible in this case, it is determined that the check is conveyed with the front and back reversed as indicated by check 4(4) (step ST28).

If character recognition is not possible, it is determined that the check is conveyed with the top and bottom inverted as in transportation states 4(2) and 4(3) (step ST29). Determining that the top and bottom are reversed is based on whether there is any change in the detection signals in step ST21. However, there are also checks that have a background pattern printed with magnetic ink over the entire front of the check. Because the detection signals from the magnetic head 54 will vary with this type of check even if the top and bottom are inverted, the top and bottom cannot be determined based on whether or not there is change in the detection signals. However, this embodiment of the invention can determine the top and bottom even with such checks by referencing the back-side character signal patterns.

As described above the check reading device 1 according to this embodiment of the invention determines if the top and bottom of the conveyed check are inverted or the front and back are reversed based detection signals from the magnetic head 54, determines that such reversed checks cannot be read, and routes and discharges such checks to the second check discharge unit 8. By thus determining if the top and bottom or the front and back of the checks 4 are reversed, checks from which the magnetic ink characters cannot be read or which cause a read error can be separated efficiently and accurately.

This embodiment of the invention also pauses check 4 transportation and waits for check reading to be evaluated when the leading end of the check 4 reaches the printing position 56A of the printing mechanism 56, that is, as soon as the trailing end passes the reading position 54A of the magnetic head 54. By thus pausing the check 4 and appropriately setting the pause time, the checks 4 can be routed to the first and second check discharge units 7 and 8 based on the result of the evaluation even if the transportation path 5 is short. And, the gate lever 66 can be moved to the appropriate routing position before the leading end of the check 4 reaches the routing position of the gate lever 66. More specifically, the printing mechanism 56 can be moved to the position where printing is possible before the endorsement printing area of the check 4 reaches the printing position 56A.

OTHER EMBODIMENTS

In the embodiment described above transporting the check 4 is paused to assure time to evaluate the result of reading the check and to move the printing mechanism 56 and the gate lever 66. This time can also be assured by slowing the check transportation speed instead of pausing transportation. For example, the length of the transportation path from the reading position 54A to the printing position 56A can be set slightly longer than the length of the check, the check can be conveyed at a slow speed from when the trailing end of the check 4 passes the reading position 54A of the magnetic head 54 until the leading end of the check reaches the printing position 56A of the printing mechanism 56, and this transportation time can be used as the check reading evaluation time and the time for moving the printing mechanism 56 and the gate lever 66.

Alternatively, the transportation path length from the reading position 54A to the printing position 56A can be set slightly shorter than the length of the check, and the check can be conveyed at a very slow speed from when the trailing end of the magnetic ink character line 4A of the check 4 passes the reading position 54A of the magnetic head 54 until the leading end of the check reaches the printing position 56A of the printing mechanism 56. This arrangement affords a more compact check reading device 1.

Resuming transporting a check 4 that was paused at the printing position 56A can also be done manually by the operator. More specifically, the operator can check the front image, the back image, and the magnetic ink characters on the screen of the computer system 73 and input from the operating unit 73b whether the check was read normally or not. This input result is supplied to the control unit 71 of the check reading device 1, and based on this input transporting the check 4 is resumed and the check 4 is routed to the first check discharge unit 7 or the second check discharge unit 8. Alternatively, the operator can operate the operating unit 75 of the check reading device 1.

The foregoing embodiment applies the invention in a check reading device, but the processing method of the invention can be used in the same way when processing recording media having printed magnetic ink characters other than checks.

Moreover, the character recognition and the evaluation can be done on the control unit 71 side in the check reading device 1.

In the example described above checks 4(1) in the normal orientation are discharged to the first check discharge unit 7 and all other checks 4 are discharged to the second check discharge unit 8. An arrangement having additional discharge units so that checks 4(2) that are transported with the top and bottom and the front and back inverted, checks 4(3) that are transported with the top and bottom inverted, checks 4(4) that are transported with the front and back reversed, and recording media that are not checks are discharged to separate individual discharge units, and an arrangement in which specific combinations of these orientations are discharged to a plurality of discharge units, are also possible. This eliminates the need to manually sort the checks when correcting the orientation and reinserting the checks 4.

While the invention has been described in conjunction with various embodiments, further alternatives, modifications and/or variations will be apparent to those skilled in the art in light of the foregoing description. Thus, the invention described herein is intended to embrace all such alternatives, modifications, applications and/or variations as may fall within the spirit and scope of the appended claims.

What is claimed is:

1. A recording media processing apparatus for processing recording media on which magnetic ink characters are printed, the apparatus comprising:
   a recording media supply unit for supplying the recording media;
   a recording media discharge unit for storing the recording media;
   a transportation path for guiding the recording media fed from the recording media supply unit in an upright position to the recording media discharge unit;
   a magnetic ink character reader disposed to the transportation path for generating output signals upon reading magnetic characters printed on the recording media;
   a transport unit for transporting the recording media along the transportation path; and a character recognition unit for analyzing the output signals from the magnetic ink character reader by comparing the output signals with previously stored signal patterns of magnetic ink characters;

wherein the transport unit pauses the transporting of the recording media for a period of time during the analyzing of the output signals.

2. A recording media processing apparatus as described in claim 1, wherein the recording media discharge unit comprises a plurality of discharge parts, the recording media processing apparatus further comprising a sorting unit for sorting each particular recording medium into one of the discharge parts based upon character recognition results.

3. The recording media processing apparatus described in claim 1, wherein a length of the transportation path from the magnetic ink character reader to a sorting unit is substantially equal to or shorter than the length of the recording medium.

4. The recording media processing apparatus described in claim 1, further comprising:

a printing mechanism for printing on the recording media upstream of the recording media discharge unit.

5. The recording media processing apparatus described in claim 1, wherein the magnetic ink character reader is a magnetic head.

6. The recording media processing apparatus described in claim 1, wherein the magnetic ink character reader is an image scanner.

7. A recording media processing apparatus for processing recording media on which magnetic ink characters are printed, the apparatus comprising:

a recording media supply unit for supplying the recording media;

a recording media discharge unit for storing the recording media;

a transportation path for guiding the recording media fed from the recording media supply unit in an upright position to the recording media discharge unit;

a magnetic ink character reader disposed to the transportation path for generating output signals upon reading magnetic characters printed on the recording media;

a transport unit for transporting the recording media along the transportation path at a first speed; and a character recognition unit for analyzing the output signals from the magnetic ink character reader by comparing the output signals with previously stored signal patterns of magnetic ink characters to determine if the magnetic characters can be recognized or not;

wherein the transport unit temporarily slows the transporting of the recording media to a second speed substantially lower than the first speed for a period of time during the analyzing of the output signals.

8. A recording media processing apparatus as described in claim 7, wherein the recording media discharge unit comprises a plurality of discharge parts, the recording media processing apparatus further comprising a sorting unit for sorting each particular recording medium into one of the discharge parts based upon character recognition results.

9. The recording media processing apparatus described in claim 7, wherein the length of the transportation path from the magnetic ink character reader to the sorting unit is substantially equal to or shorter than the length of the recording medium.

10. The recording media processing apparatus described in claim 7, further comprising:

a printing mechanism for printing on the recording media upstream of the recording media discharge unit.

11. The recording media processing apparatus described in claim 7, wherein the magnetic ink character reader is a magnetic head.

12. The recording media processing apparatus described in claim 7, wherein the magnetic ink character reader is an image scanner.

13. A method of processing recording media on which magnetic ink characters are printed, the method comprising:

transporting the recording media at a first speed in an upright position along a transportation path from a recording media supply unit to a recording media discharge unit;

reading magnetic characters printed on the recording media and generating output signals based thereon;

analyzing the output signals using a magnetic character reader disposed to the transportation path, the analyzing including comparing the output signals with previously stored signal patterns of magnetic ink characters to determine if the magnetic characters can be recognized or not; and pausing the transporting of the recording media for a period of time during the analyzing of the output signals, or slowing the transporting of the recording media to a second speed substantially lower than the first speed for a period of time during the analyzing of the output signals.

* * * * *